(12) United States Patent
Takahashi

(10) Patent No.: US 7,458,004 B2
(45) Date of Patent: Nov. 25, 2008

(54) SEMICONDUCTOR STORAGE DEVICE

(75) Inventor: Hiroyuki Takahashi, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 388 days.

(21) Appl. No.: 11/102,797

(22) Filed: Apr. 11, 2005

(65) Prior Publication Data
US 2005/0229077 A1    Oct. 13, 2005

(30) Foreign Application Priority Data
Apr. 12, 2004   (JP) ............................. 2004-116628
Feb. 22, 2005   (JP) ............................. 2005-045316

(51) Int. Cl.
G11C 29/00    (2006.01)
(52) U.S. Cl. ........................................ 714/763
(58) Field of Classification Search ................. 714/763
See application file for complete search history.

(56) References Cited

U.S. PATENT DOCUMENTS

| | | | |
|---|---|---|---|
| 4,766,573 A * | 8/1988 | Takemae | 365/222 |
| 6,233,717 B1 * | 5/2001 | Choi | 714/805 |
| 6,611,938 B1 * | 8/2003 | Tanaka et al. | 714/763 |
| 7,076,722 B2 * | 7/2006 | Shibata | 714/763 |

FOREIGN PATENT DOCUMENTS

| | | |
|---|---|---|
| JP | 62-117198 | 5/1987 |
| JP | 7-254300 | 10/1995 |
| JP | 11-102326 | 4/1999 |
| JP | 11-213659 | 8/1999 |
| JP | 2000-231788 | 8/2000 |
| JP | 2000-348497 | 12/2000 |
| JP | 2002-25299 | 1/2002 |

OTHER PUBLICATIONS

Japanese Office Action dated Jul. 24, 2007 with parital English translation.

* cited by examiner

*Primary Examiner*—Shelly A Chase
(74) *Attorney, Agent, or Firm*—McGinn IP Law Group, PLLC

(57) ABSTRACT

Disclosed is a semiconductor storage device including an error correction bit generating circuit for generating error correction bits from data composed of a predetermined number of bits. The semiconductor storage device is featured by generating error correction bits using data supplied from outside and data stored in memory cells. More specifically, the semiconductor storage device includes a write amplifier for receiving first data supplied from outside, a first group of memory cells having stored second data corresponding to an address pertinent to the first data, an error correction bit generating circuit for generating error correction bits based on the first and second data, a second group of memory cells for storage of the first data, and a third group of memory cells for storing the error correction bits.

13 Claims, 14 Drawing Sheets

SEMICONDUCTOR STORAGE DEVICE

FIELD OF THE INVENTION

The present invention relates to a semiconductor storage device and, more particularly to a semiconductor storage device having an ECC (error correction code) function.

BACKGROUND OF THE INVENTION

In e.g. a server system, where extremely high reliability is required, memory errors may be a cause for a fatal system fault. For avoiding the problem of memory errors, such a memory having an error correcting function has been developed. This memory is able to detect the presence of a memory error, specify the location where an error has occurred, and to correct the error.

The memory having such error correcting function, or the so-called ECC function, adopts for example a Hamming code as check bits. The number of check bits is correlated with the data bus width, such that, in case the data bus width is N bits, the number of the check bits may be found by taking a log of N with a base of 2 and by adding 2 to the so obtained log. Thus, in a memory having a data bus width of 64 bits, and 256 bits are to be accessed, 8 bits×4=32 error correction bits are needed. For addressing to this problem, the following Patent Document discloses a method for burst transfer of e.g. 64 bits to generate error correction bits in terms of 256 data bits. By this method, 9 error correction bits are sufficient.

[Patent Document 1]
Japanese Patent Kokai Publication No. JP-A-11-102326

SUMMARY OF THE DISCLOSURE

However, in case the number of bits required for error correction is 256 bits and write data is less than 256 bits, such as one byte, or in case data is written in a burst but the transfer data is masked, there is raised a problem that error correction bits cannot be generated.

A semiconductor storage device in accordance with an aspect of the present invention, comprises an error correction bit generating circuit for generating error correction bits from data of a predetermined number of bits, wherein the error correction bits are generated using data supplied from outside and data stored in one or plurality of memory cells.

In another aspect, the present invention provides a semiconductor storage device comprising a write amplifier for receiving first data supplied from outside, a first group of memory cells having stored therein second data corresponding to an address pertinent to the first data, an error correction bit generating circuit for generating error correction bits based on the first and second data, a second group of memory cells for storage of the first data, and a third group of memory cells for storing error correction bits.

The semiconductor storage device according to the present invention includes a burst mode and, if there is only part of data supplied in the burst mode, the part of the data and data stored in the memory cells are used to generate error correction bits.

In another aspect, the present invention provides a semiconductor storage device for writing data of a predetermined number of bits in a plurality of memory cells in a lump, wherein, if part of the data of the preset bits is not stored in associated memory cells due to the mask information, error correction bits are generated using the data stored in the memory cells.

In yet another aspect, the present invention provides a semiconductor storage device having an access bit length smaller than an access bit length to memory cells, wherein the semiconductor storage device comprises an ECC encoding circuit for generating error correction bits, at the time of writing, using external data received from outside, the external data being of a length corresponding to the number of access bits to the memory cells, in keeping with one access address, and an ECC decoding circuit for carrying out ECC decoding in read, based on data corresponding to the length of the access bits to the memory cells for one access address and associated error correction bits. The ECC encoding circuit generates error correction bits using data stored in memory cells corresponding to the access address in case data received during writing for an access address is smaller than the access bit length to the memory cells. In case the number of the received data is equal to the number of access bits to the memory cells, the ECC encoding circuit of the semiconductor storage device generates error correction bits without employing the data stored in the memory cells.

The meritorious effects of the present invention are summarized as follows.

According to the present invention, described above, the problem that arises in case the number of actual input data is not up to the number of data bits as the subject of the ECC processing may be resolved.

In addition, in case the number of actual input data is equal to the number of data bits necessary for ECC processing, the speed of generation of the error correction bits may be enhanced.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Preferred embodiments of the present invention are explained in detail with reference to the drawings.

Figure 1:
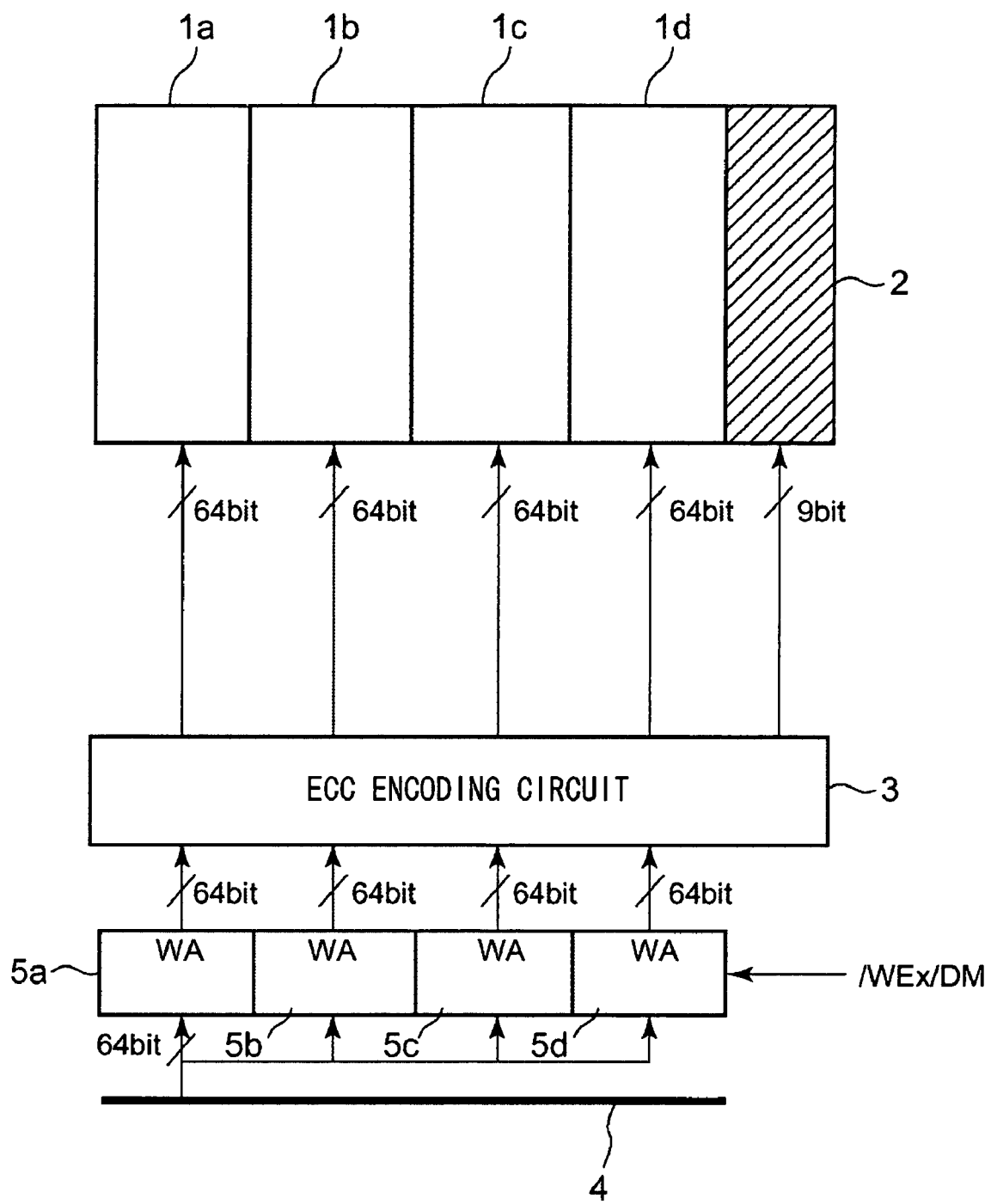
FIG. 1 is a diagram showing a first write operation of a semiconductor storage device according to a first embodiment of the present invention.
Figure 2:
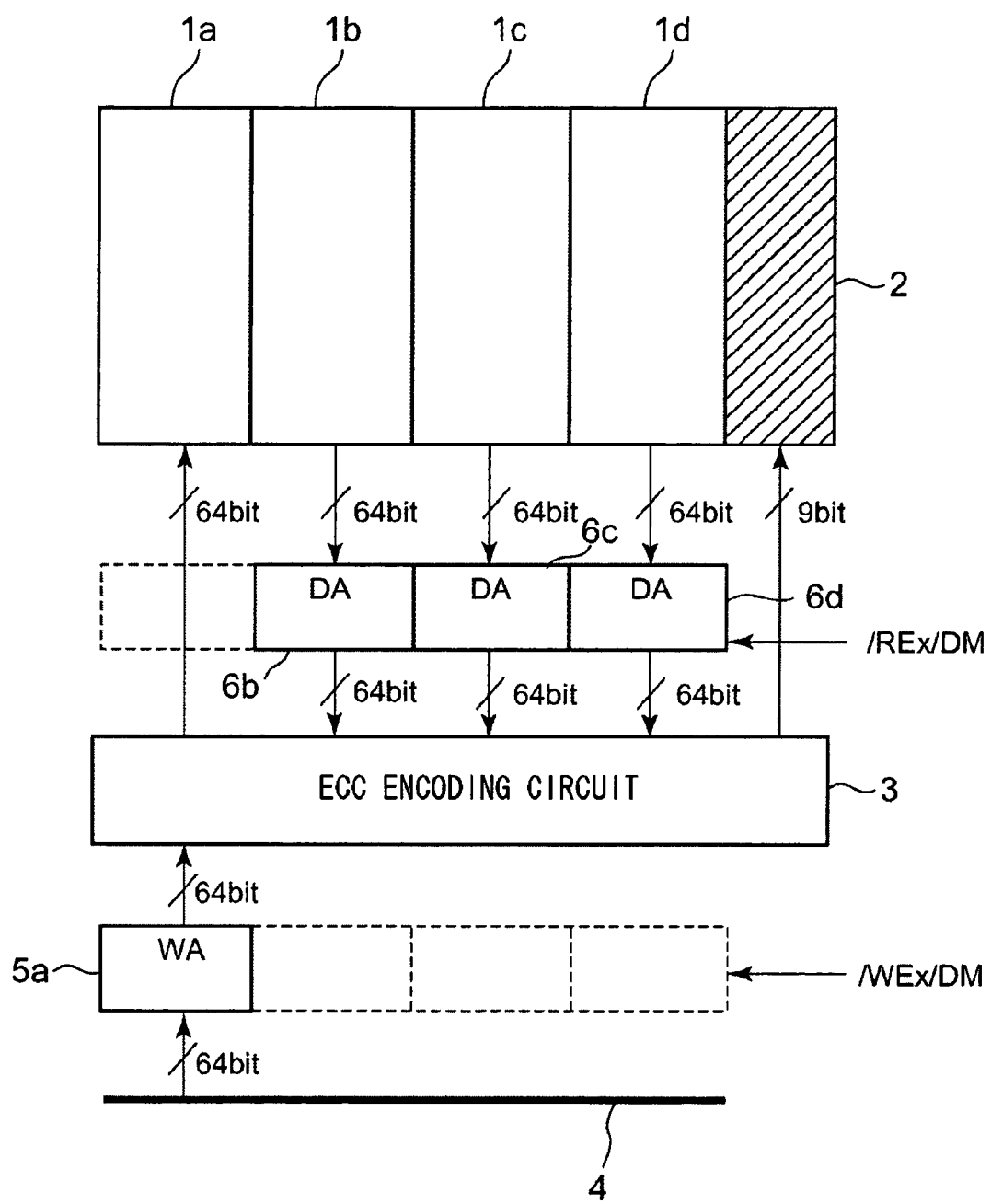
FIG. 2 is a diagram showing a second write operation of the semiconductor storage device according to the first embodiment of the present invention.
Figure 3:
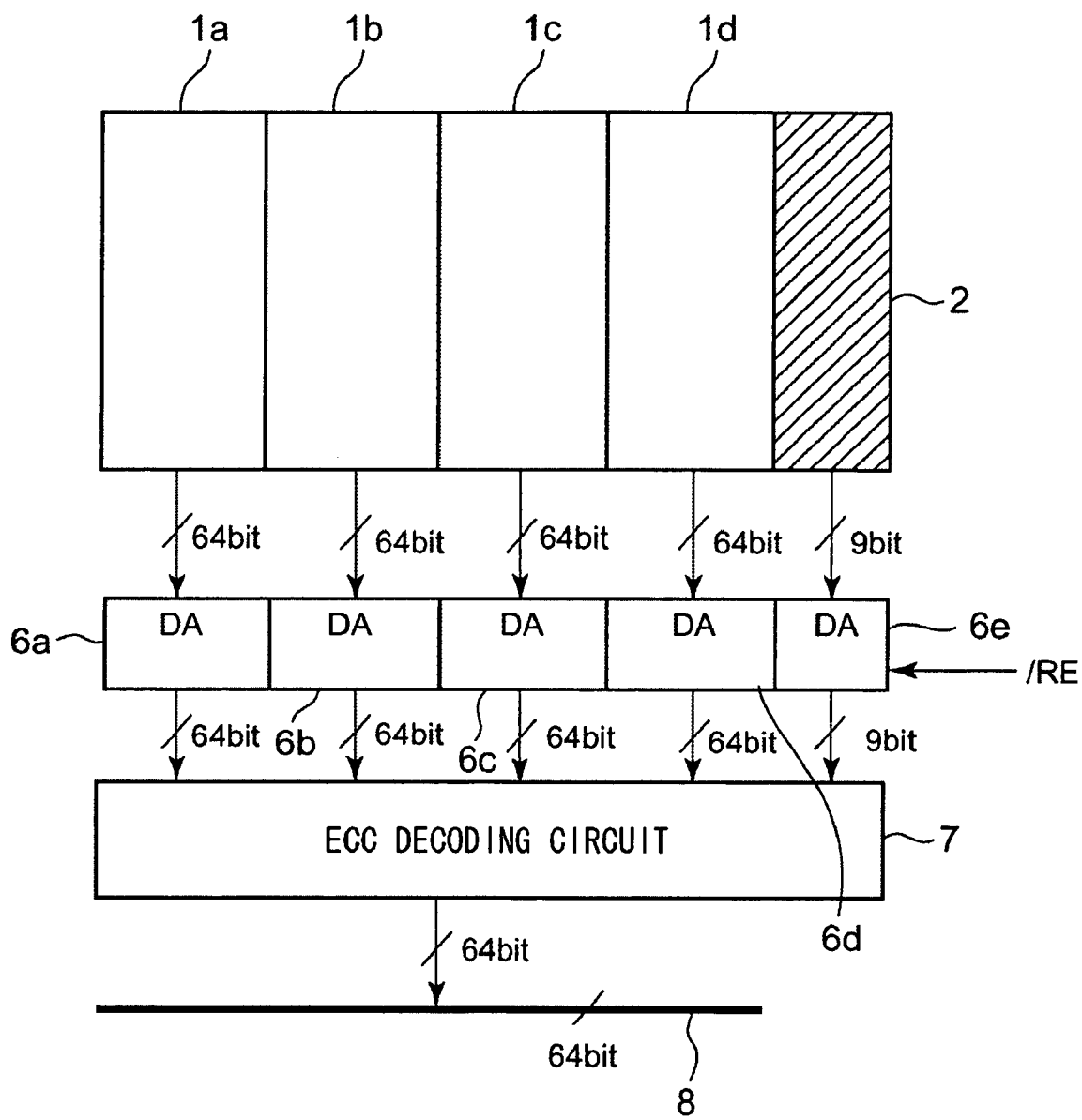
FIG. 3 is a diagram showing the read operation of the semiconductor storage device according to a first embodiment of the present invention.

FIGS. 1 to 3 illustrate a semiconductor storage device according to a first embodiment of the present invention.

FIG. 1 illustrates data write operation and ECC operation of a semiconductor storage device according to the first embodiment of the present invention. In FIG. 1, the process of generating 9 error correction bits, responsive to 256-bit data, and storing the 256-bit data in a cell array core block and in an ECC code cell, are schematically illustrated.

The semiconductor storage device according to the first embodiment of the present invention, includes a plural number of cell array core blocks 1*a* to 1*d*, an ECC code cell 2, an ECC encoding circuit 3, a write data bus 4 and write amplifiers 5*a* to 5*d*. The cell array core blocks 1*a* to 1*d* are collectively termed a cell array core. The operation of the device is now explained in detail.

The semiconductor storage device according to the present embodiment, four 64-bit data, that is, first to fourth consecutive write data (64 bit) are sequentially supplied in a burst write operation from outside the semiconductor storage device (memory) through a write data bus 4 to write amplifiers 5*a* to 5*d*. The write amplifiers 5*a* to 5*d* are activated by a write enable signal /WE and by a write data mask signal /DM, which signal /DM indicates that the four data are valid each data of the 64 bit data corresponds to a sole address. Specifically, the first address, corresponding to the first write data, is an external address, supplied from outside, and the following second to fourth addresses are internal addresses generated in the inside. The ECC encoding circuit 3 receives a sum total of 256 bits from the write amplifiers to generate error correction bits of 9 bits. The 256 write data and the 9 error correction bits are then transferred simultaneously to the memory cell blocks 1*a* to 1*d* and to the ECC code cell 2 for storage in associated memory cells.

FIG. 2 shows the method of generating error correction bits of the semiconductor storage device of FIG. 1. In the present embodiment, the method for forming error correction bits in case 192 out of 256 bits of burst data have been masked is described.

The first write data of 64 bits, corresponding to the first address, are supplied from outside over write data bus 4 to the write amplifier 5*a*. The write data corresponding to the second to fourth internal addresses are not brought in. The information pertinent to these write data is supervised by e.g. a write data mask signal supplied from outside. In short, the access control circuit of the memory (22 in FIG. 4, not shown in FIG. 2) is able to comprehend, by the write data mask signal /DM, which data is effective, that is, which received data is to be written in the memory. In this case, only the write amplifier 5*a* is activated by the data mask signal /DM specifying that the first write data is valid.

A word line, corresponding to 256 bits in the memory cell blocks 1*a* to 1*d*, is activated by the address corresponding to the first address supplied from outside. Then, for executing dummy read, the access control circuit (not indicated in Figures) activates data amplifiers 6*b* to 6*d*, based on a read enable signal /RE and the write data mask signal /DM. By this operation, the second to fourth data, stored in the memory cells in the memory cell blocks 1*a* to 1*d*, associated with the second to fourth internal addresses, are read to the data amplifiers 6*b* to 6*d*, and thence supplied to the ECC encoding circuit 3. Then, by inverting the signals /RE and /WE, the data amplifiers 6*b* to 6*d* are inactivated, while the write amplifier (WA) 5*a* is activated. By this operation, the first write data is written in the memory cell corresponding to the first address in the memory cell block 1*a*. The ECC encoding circuit 3 generates error correction bits of 9 bits, from the first write data of 64 bits, which have been supplied from outside, and from the second to fourth data of 192 bits, which have been transferred from the memory cell blocks, and writes the error correction bits, now generated, in the memory cells in the ECC code cell 2 corresponding to the first address.

Thus, by executing dummy-reading from the masked memory cells, out of the memory cells, specified by the write addresses, as supplement data for masked data, in a write operation of one burst cycle, the ECC encoding circuit 3 may acquire 256-bit data, which may then be used to carry out the encoding processing. With the present invention, 9-bit encoding may be implemented at all times by employing the above method.

FIG. 3 shows read operation in a semiconductor storage device according to the present embodiment.

The 64-bit information, as first read data, is transferred to the data amplifier 6*a* from preset memory cells of the memory cell blocks 1*a*, in association with the external address supplied from outside. On the other hand, the information of 192 bits in all, as second to fourth read data, each of 64 bits, is sent to the data amplifiers 6*b* to 6*d*, from the memory cell blocks 1*a* to 1*d*, in association with the three burst internal addresses, internally generated based on the external address. In addition, the error correction bit information, stored in the preset cells in the ECC code cell 2, associated with the external address supplied, is transferred to a data amplifier 6*e*. The data amplifiers 6*b* to 6*e* amplify the received information to transmit the so amplified information to an ECC decoding circuit 7. This ECC decoding circuit 7 executes ECC decoding processing on the first to fourth read data of 256 bits and error correction bits of 9 bits to serially send out error-corrected data to a read data bus 8, in terms of 64 bits as a unit.

During the read operation, ECC decoding processing is carried out using 256 bits of the pre-fetch data and the 9-bit Hamming codes, associated therewith, as described above.

Figure 4:
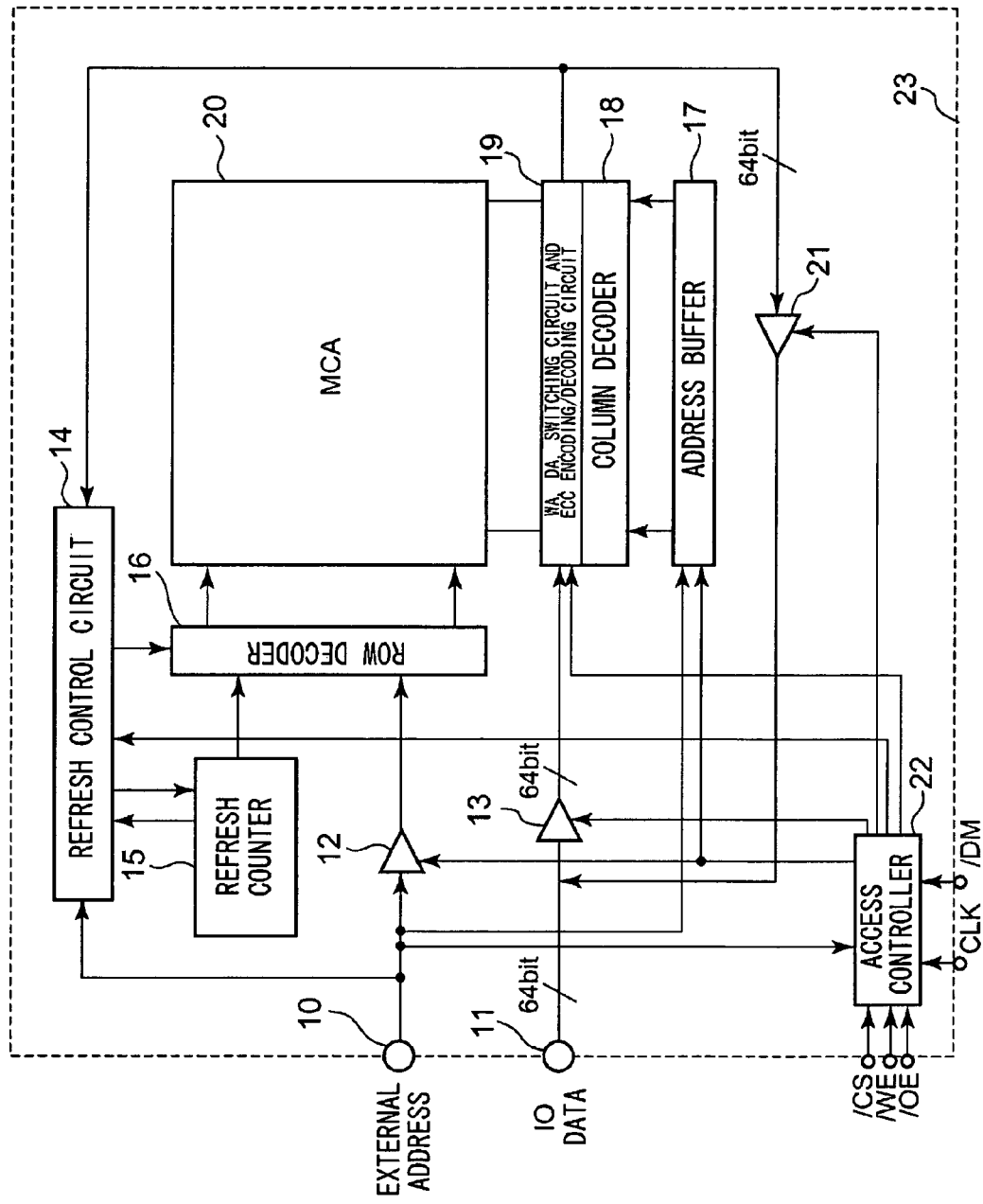
FIG. 4 is a diagram showing a configuration of a semiconductor memory according to the present invention.

FIG. 4 shows a semiconductor storage device employing the above-described embodiment of the present invention. The semiconductor storage device, shown in FIG. 4, is a so-called mobile SRAM, in short, it is a memory having an SRAM interchange interface and a memory cell formed as a dynamic cell made up by one transistor and one capacitor.

In a mobile SRAM, the internal access structure may be constructed freely, even though its access unit with the outside is 64 bits. That is, the access to the memory core may be of a pre-fetch structure and hence the data read length to the memory core may e.g. be 256 bits without dependency on the access unit with outside. The Hamming code may be 9 bits.

The mobile SRAM of the present embodiment is now explained with reference to FIG. 4.

A portion of the external address, supplied in an external address pin 10, is supplied to a row address buffer 12. This row address buffer 12 transfers an external address to a row decoder 16, based on a control signal from an access controller 22. An input/output pin 11 is a terminal for inputting/outputting data. A write buffer 13 is driven by a control signal which is activated at the time of writing to send input data to a circuit 19. A column address buffer 17 is supplied with the remaining portion of the external address. The column address buffer 17 includes a burst address generating circuit. In case the burst length is "4", the address buffer generates first to third internal addresses, in association with the external address. The circuit 19 includes the write amplifiers (WA), data amplifiers (DA) and an ECC coding and decoding circuit, shown in FIGS. 1 to 3. Referring to FIGS. 1 and 2, the write amplifiers of FIG. 4 represent plural write amplifiers WA, of which the write amplifier specified by the mask signal /DM and the write enable signal /WE is activated. Referring to FIGS. 2 and 3, the read amplifier of FIG. 4 includes plural read amplifiers, of which the read amplifier specified by the mask signal /DM and the read enable /RE is activated. For example, the write enable signals /WE and read enable signals /RE are complementary signals. DM is a complementary signal of the data mask signal /DM. The circuit 19 also includes a switch circuit which is responsive to an output signal of a column decoder 18 to establish electrical connection of an IO pin side bus and a bit line provided in a memory cell array 20.

Figure 7:
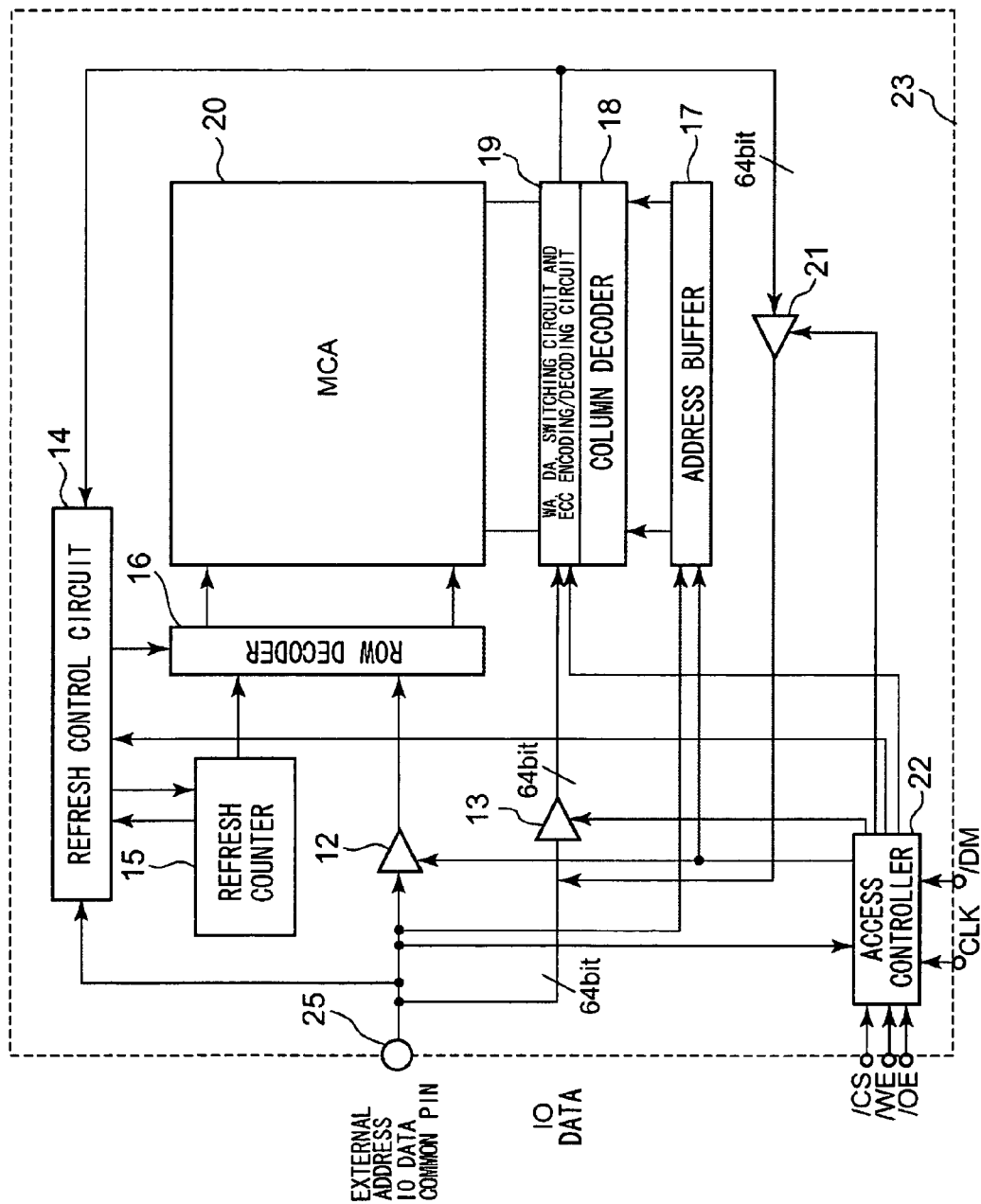
FIG. 7 is a diagram showing a schematic configuration of a second semiconductor memory according to the present invention.
Figure 8:
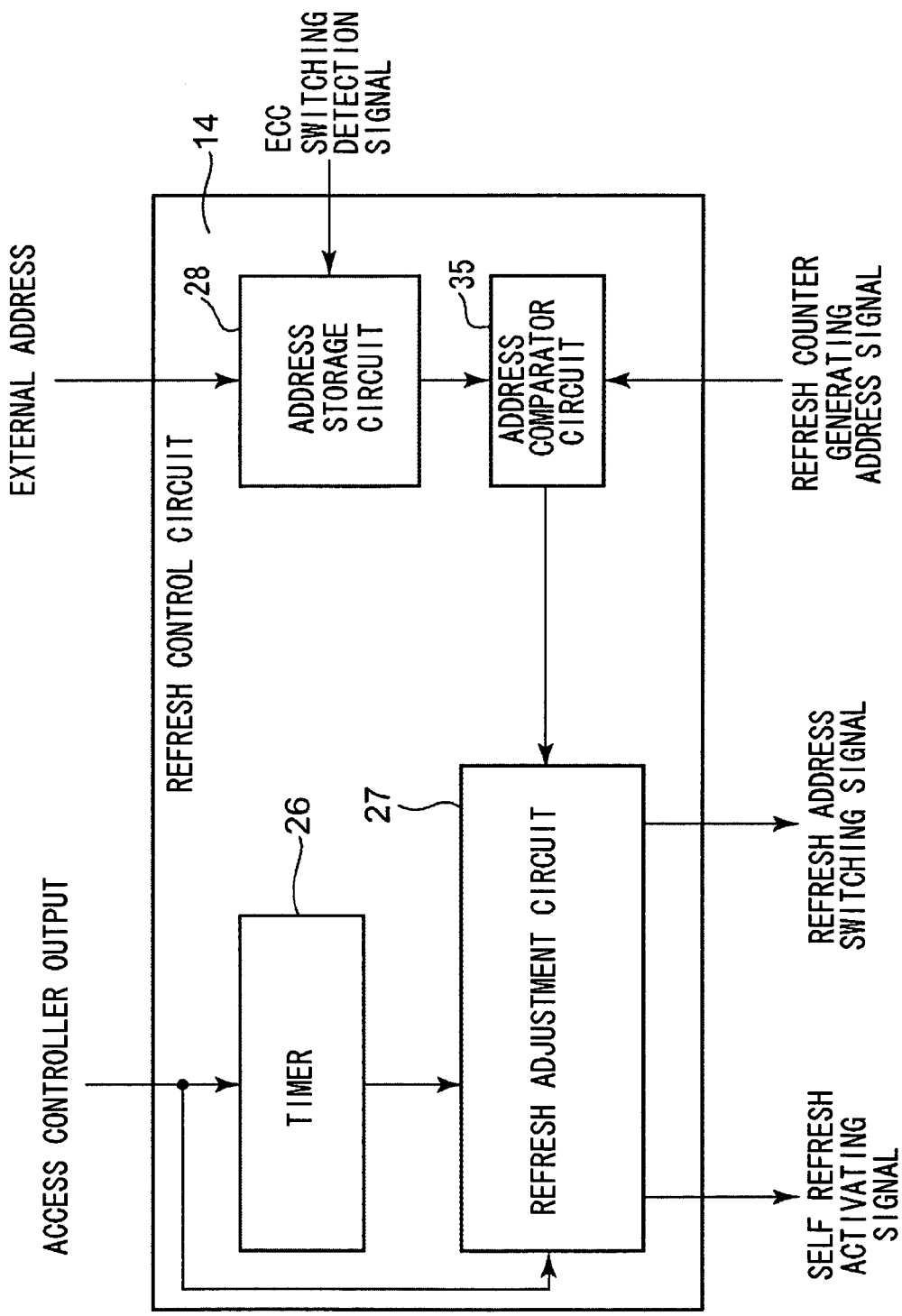
FIG. 8 is a diagram showing a detailed configuration of the second embodiment of the semiconductor memory according to the present invention.

Since the mobile SRAM uses dynamic memory cells, and has an interface compliant to SRAM, refresh control required for data retention by the memory cells is carried out automatically within the SRAM. In short, any refresh command from outside is unnecessary and the refresh cycles can be freely set by refresh control. The refresh control is carried out by a refresh counter 15 and a refresh control circuit 14, as shown in FIGS. 4 and 7. FIG. 8 shows an example of a configuration of refresh control circuit 14 of FIG. 4. The refresh control circuit 14 includes a timer 26 for periodically generating a refresh trigger signal, as shown in FIG. 8. The control of timer 26 is rendered variable responsive to e.g. a mode-indicating signal (access controller output in FIG. 8), output by an access control circuit 22 (referring to FIG. 4), in order to vary the period of the timer 26 for the active mode from that for the standby mode. Specifically, the period of the timer 26 for the active mode is set so as to be shorter to carry out the refresh operations frequently to satisfy disturb hold characteristics for the active mode. On the other hand, the period of timer 26 for the standby mode is set so as to be longer to reduce power consumption as well as to satisfy static hold characteristics. This reduction in power consumption will be explained subsequently.

In a refresh control circuit 14, the refresh period may also be freely set by the timer control as described above responsive to an output of the circuit 19, that is, to the information for error correction. In more detail, referring to FIG. 8, if there has occurred error correction by the ECC, the refresh control circuit 14 stores the external address at the time of the error correction in an address storage circuit 28 thereof and subsequently controls the refresh address generated by the refresh counter 15, in such a manner that the refresh period of the stored address will be shorter, thereby assuring data reliability.

Referring to FIG. 8, more specifically, the address storage circuit 28 of the refresh control circuit 14 stores the external address (row address) when the ECC switching detection signal is active. An address comparator circuit 35 compares the address stored in the address storage circuit 28 to the refresh address from the refresh counter 15 to output a signal indicating the result of comparison to the refresh adjustment circuit 27. On receipt of a coincidence signal from the address comparator circuit 35, the refresh adjustment circuit 27 manages control for activating the refresh control signal, for shortening the refresh period, because the address is the address where ECC correction has occurred.

On the other hand, if no error correction by ECC has occurred, the refresh period setting is maintained. The refresh control circuit 14 also has the function of outputting a self refresh activation signal to the refresh counter 15 in case the signal from the access control circuit 22 indicates that no access has been detected for a preset period. That is, the refresh adjustment circuit 27 receives a signal from the access controller 22 (output of the access controller of FIG. 8) and an output of the timer 26 (time-out output) and, in case the signal from the access controller 22 indicates the absence of the access for a preset time period, activates the self refresh activation signal to output the so activated self refresh activation signal to the refresh counter 15. The refresh counter 15 is responsive to the self refresh activation signal to output a refresh address to the row decoder 16. The row decoder 16 is responsive to a refresh address changeover signal from the refresh control circuit 14 to selectively output an external row address or a refresh address.

The access control circuit 22 receives the write data mask signal /DM and exercises control so that, in case the write data mask signal /DM is active (low level), the specified write amplifier will not be activated. In short, the access control circuit 22 takes charge of the function of masking and hence not writing data, the writing of which is not desirable, out of write data of a preset burst length, that is, so-called write burst data. The above-mentioned preset burst length is continuously given a data input pin for the write mode. The access control circuit 22 is supplied with a chip select signal CS, a write enable signal WE, an output enable signal OE and a clock signal CLK, to output a mode signal, indicating the mode, from the control signals received.

Figure 5:
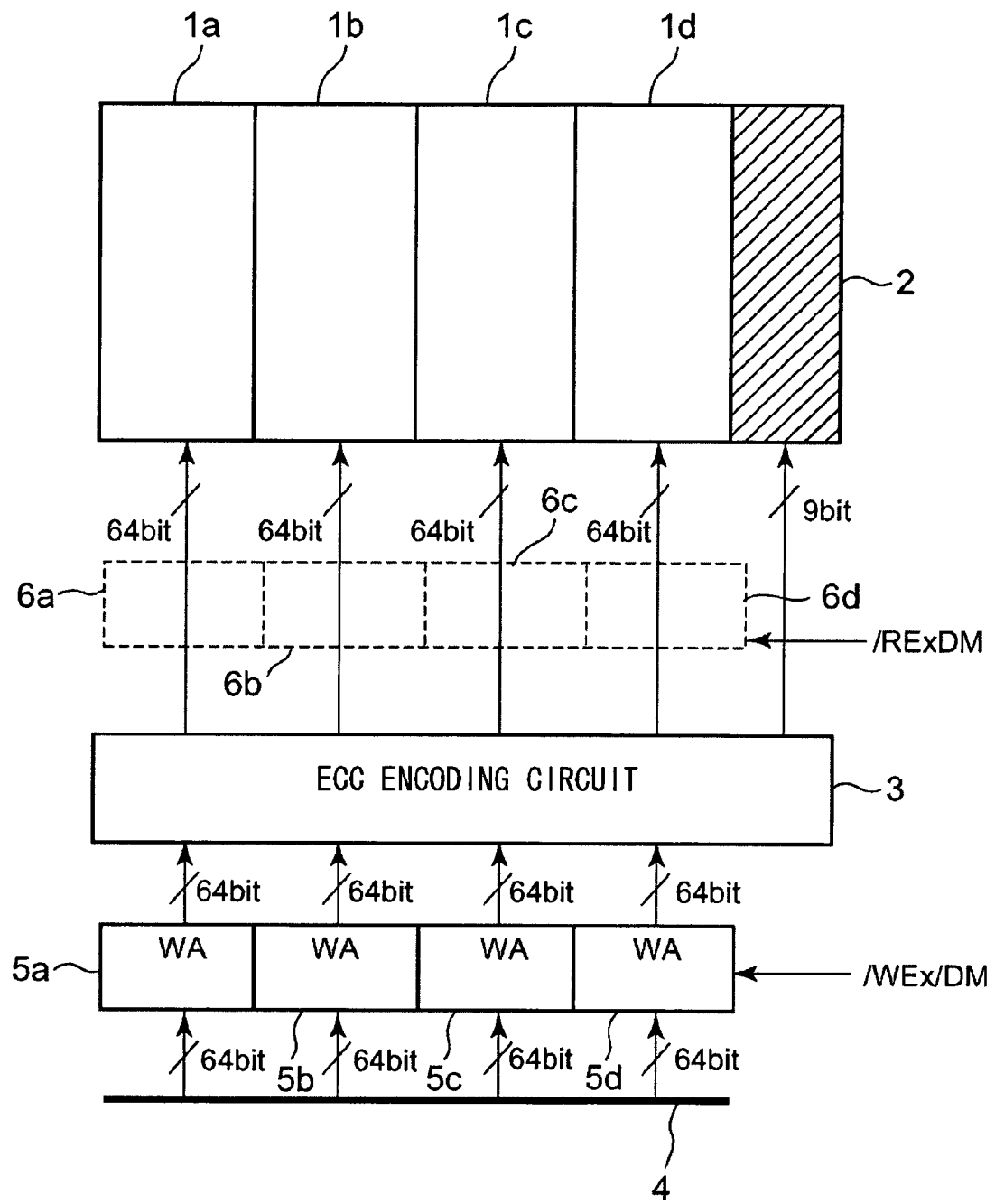
FIG. 5 is a diagram showing a third write operation of the semiconductor storage device according to the first embodiment of the present invention.

Except if the write data mask signal /DM is active, the access control circuit 22 is able to activate all of the write amplifiers as well as to inactivate all of the read amplifiers. That is, the access control circuit 22 activates all of the write amplifiers 5a to 5d, while inactivating all of the data amplifiers 6b to 6d, as shown in FIG. 5.

Figure 6:
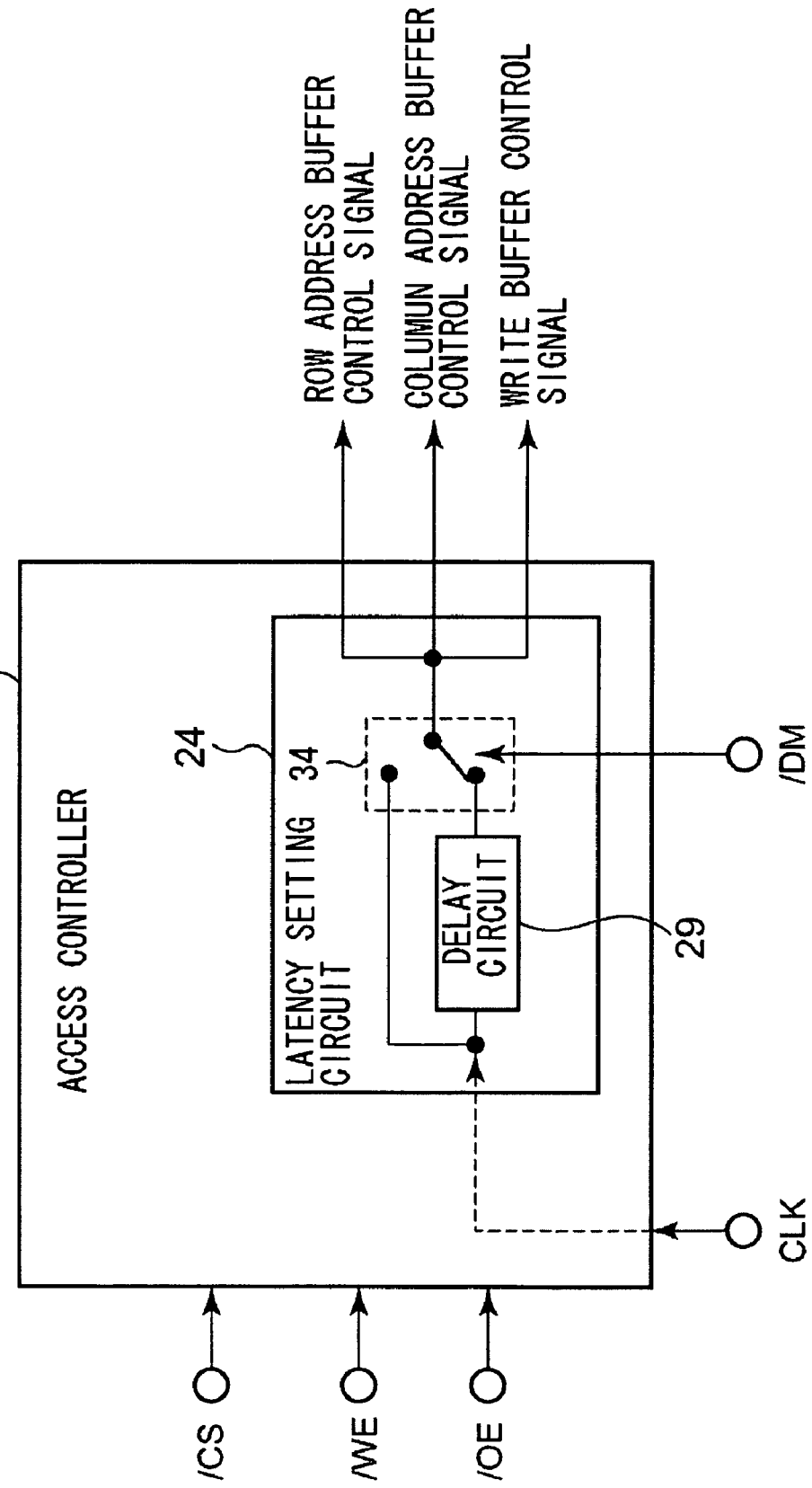
FIG. 6 is a diagram showing a detailed configuration of the semiconductor memory according to the present invention.
Figure 12:
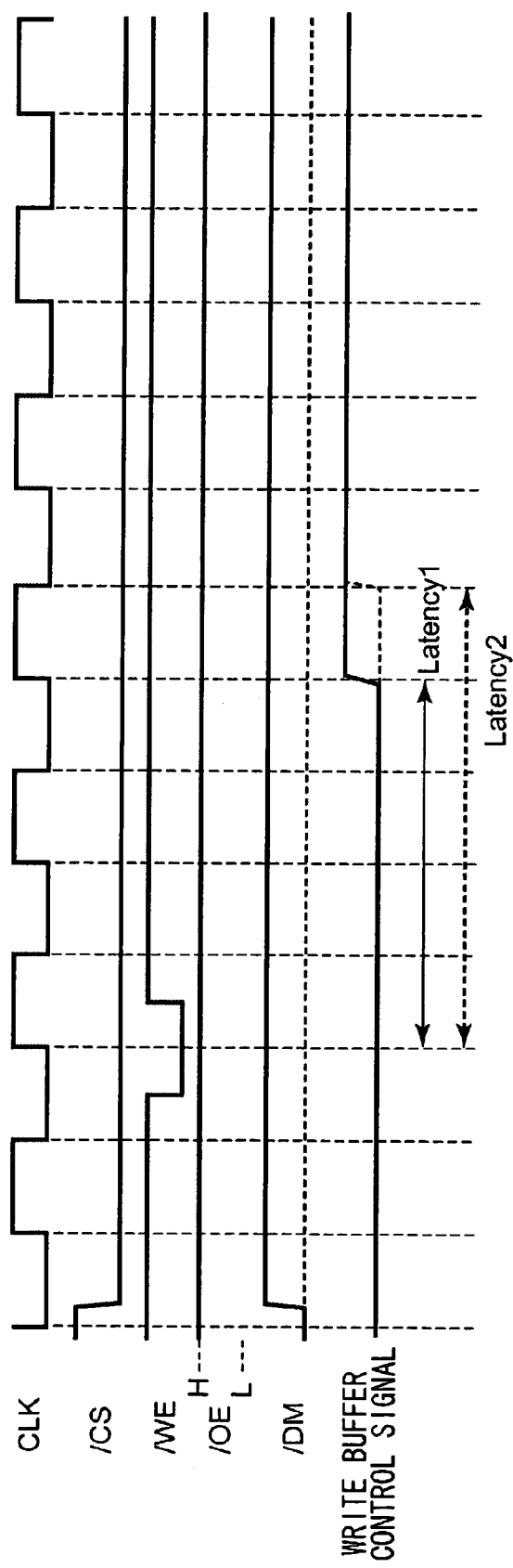
FIG. 12 is a first detailed timing diagram of a semiconductor memory according to the present invention.

Referring to FIG. 6, the access control circuit 22 is provided with a latency setting circuit 24, and is responsive to the state of the write data mask signal /DM, that is, to the number of bits of input data, to adjust the control timing of the row address buffer 12, write buffer 13 and the column address buffer 17. As shown in FIG. 12, CLK is a clock signal which has a preset minimum period. By setting /CS (chip select) to a low level, setting /WE (write enable signal) to a low level and setting /OE (output enable signal) to a high level, the entry into the write mode is executed. Data is masked or not masked in case /DM (data mask signal) is low or high level, respectively. If only the external input data is used in accordance with the data mask signal, the time for reading cell data is not needed, and hence the timing of validating the externally input address or data (latency) is set to a fast latency (Latency 1 in FIG. 12), by bypassing a delay circuit 29 shown in FIG. 6. If the externally input data and the cell read data are used, the latency is set to a slow latency (Latency 2 of FIG. 12) to take the time needed in reading cell data into account, without bypassing the delay circuit 29 in FIG. 6. Referring to FIG. 6, the latency setting circuit 24 includes a delay circuit 29 which receives a clock signal CLK from a lock terminal, and a selector 24 which receives an output of the delay circuit 29 and the clock signal CLK from the clock terminal to select and output one of the output of the delay circuit and the clock signal CLK depending on the value of the write data mask signal /DM. It is noted that, in FIG. 4, the external address pin 10 and the input/output pin 11 are shown as respective independent terminals. The external address pin 10 and the input/output pin 11 may, however, be a common terminal 25, by controlling the row address buffer 12, an output buffer 21 and the input buffer 13, as shown in FIG. 7.

Figure 9:
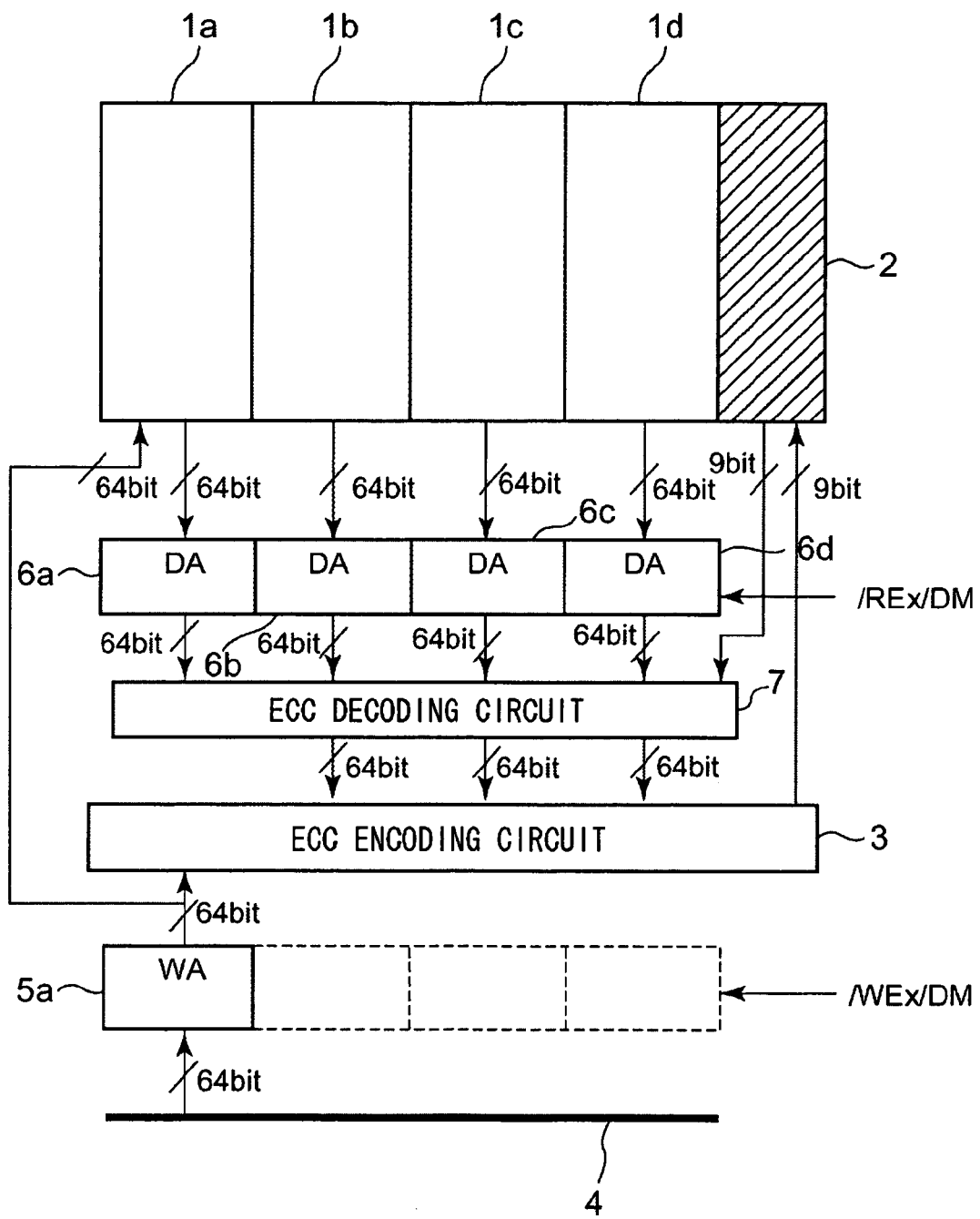
FIG. 9 is a diagram showing a write operation of the semiconductor storage device according to the second embodiment of the present invention.
Figure 10:
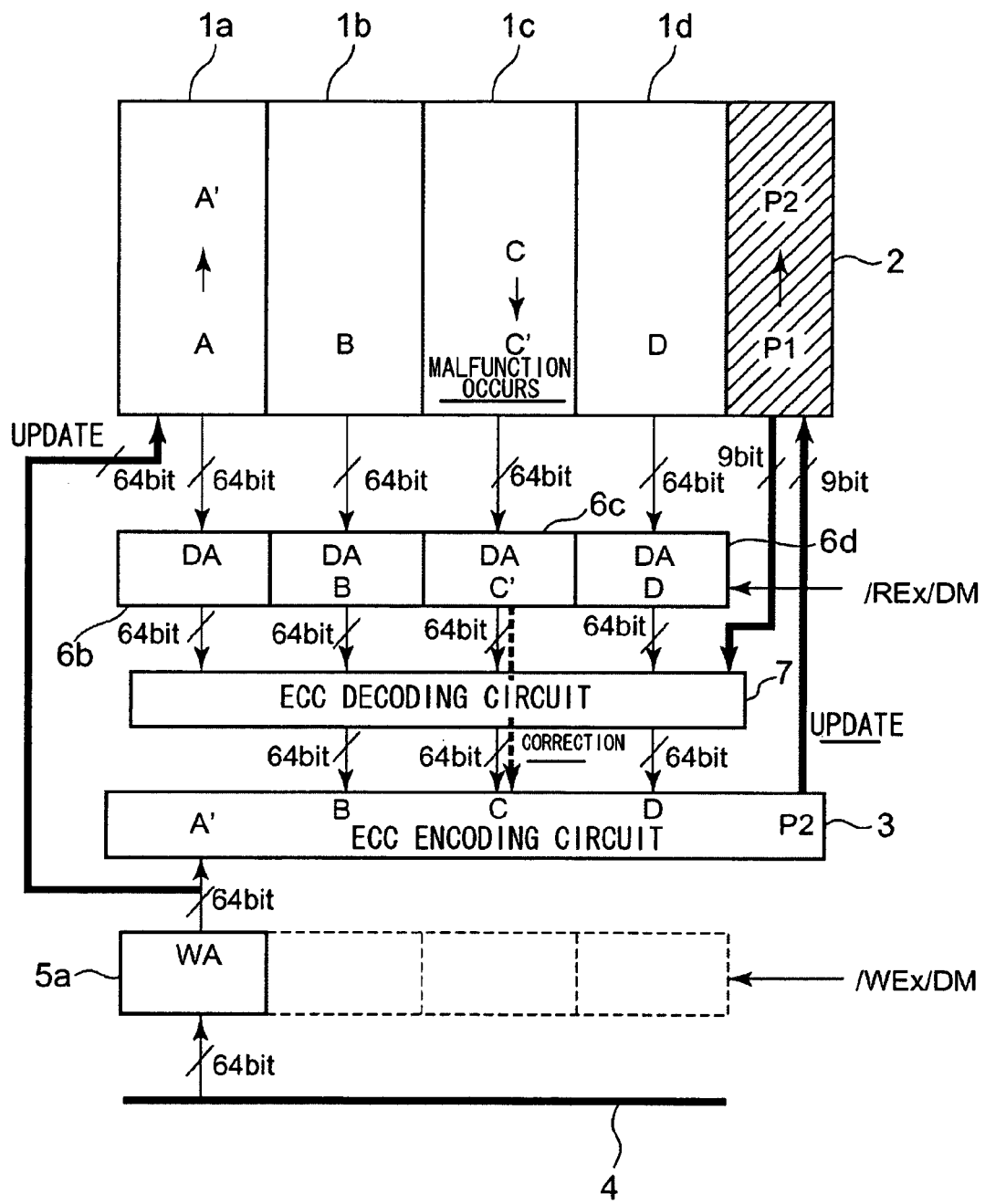
FIG. 10 is a diagram showing schematics of the write operation of the semiconductor storage device according to the second embodiment of the present invention.

A second embodiment of the present invention is shown in FIG. 9. The present embodiment is directed to a method for forming error correction bits employing dummy read, whereby it is possible to achieve reliability higher than that in the first embodiment. It is assumed here that, as in the case of FIG. 2, 192 out of 256 bits of the burst data are masked. In the embodiment shown in FIG. 2, the 192 bits to be masked are transferred through the data amplifiers 6b to 6d and directly sent to the ECC encoding circuit 3 as dummy data from the memory cell array core blocks 1b to 1d. In the present embodiment, outputs of the data amplifiers 6b to 6d are corrected by an ECC decoding circuit 7 with the 9 error correction bits for the cell data 1a to 1d, and so corrected outputs from the ECC decoding circuit 7 are supplied to the ECC encoding circuit 3. By so doing, even in such case where dummy read data are fail data, for example, in such case where dummy read data from the cell 1c is fail data such that C is turned into C', the ECC decoding circuit 7 corrects C' to C by employing error correction bits P1 for 256 bit data A to D for the original memory cell array core blocks 1a to 1d, as shown in FIG. 10. In this manner, the error correction bits may be correctly updated to P2, using updated external data A' and B to D.

Figure 11:
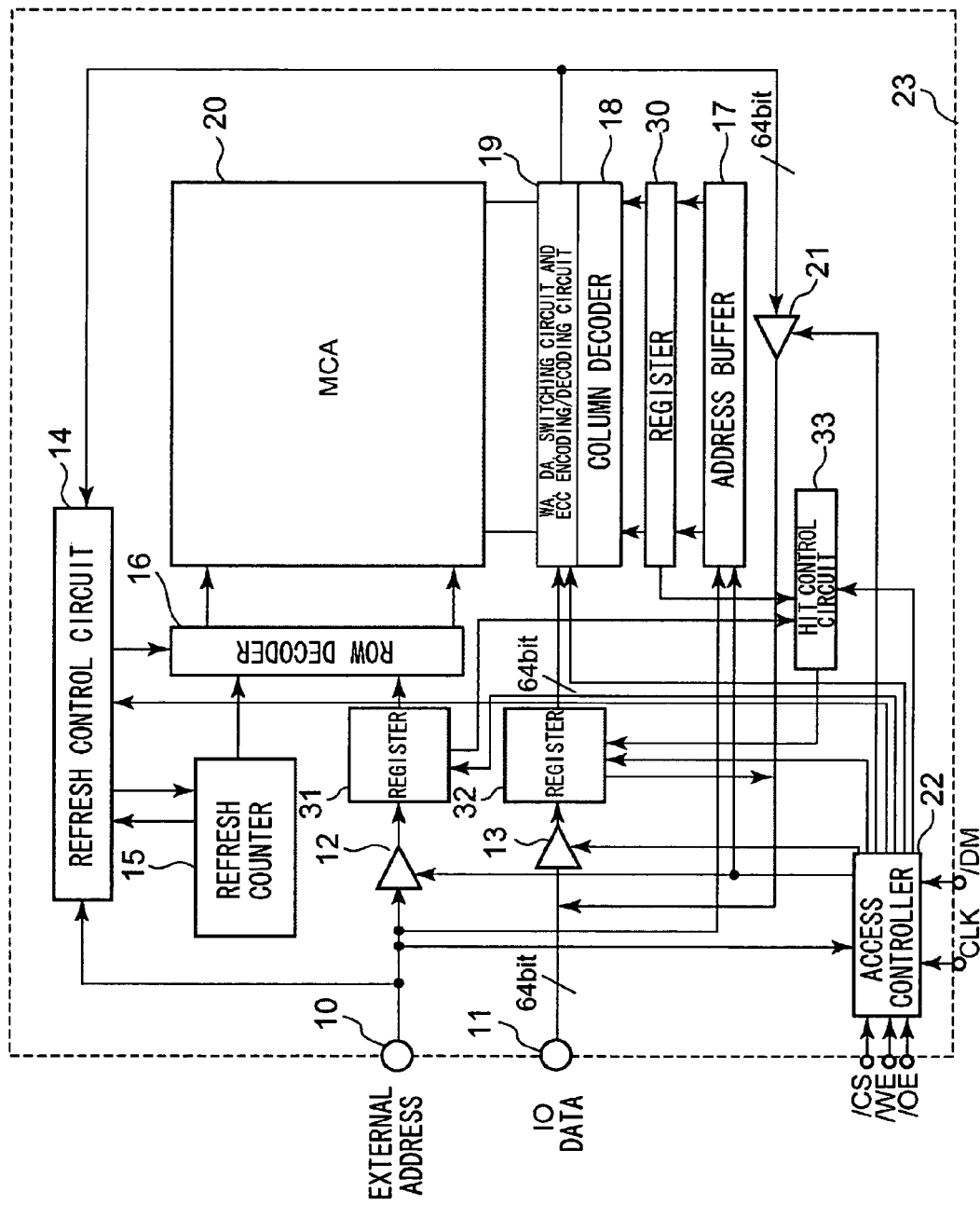
FIG. 11 is a diagram showing a configuration of a third embodiment of the semiconductor memory according to the present invention

A third embodiment of the present invention is shown in FIG. 11. The present embodiment includes, in addition to the functions of the above-described first and second embodiments, a late write function, for achieving continuous burst write operations. The late write function is such a function in which, in a memory cycle where a write request is made from outside, the write address and the write data as supplied are simply sampled in registers R1 to R3 within the semiconductor storage device and held therein until the write request is made next time. This function is now explained in more detail by referring to the timing chart of FIG. 13.

Figure 13:
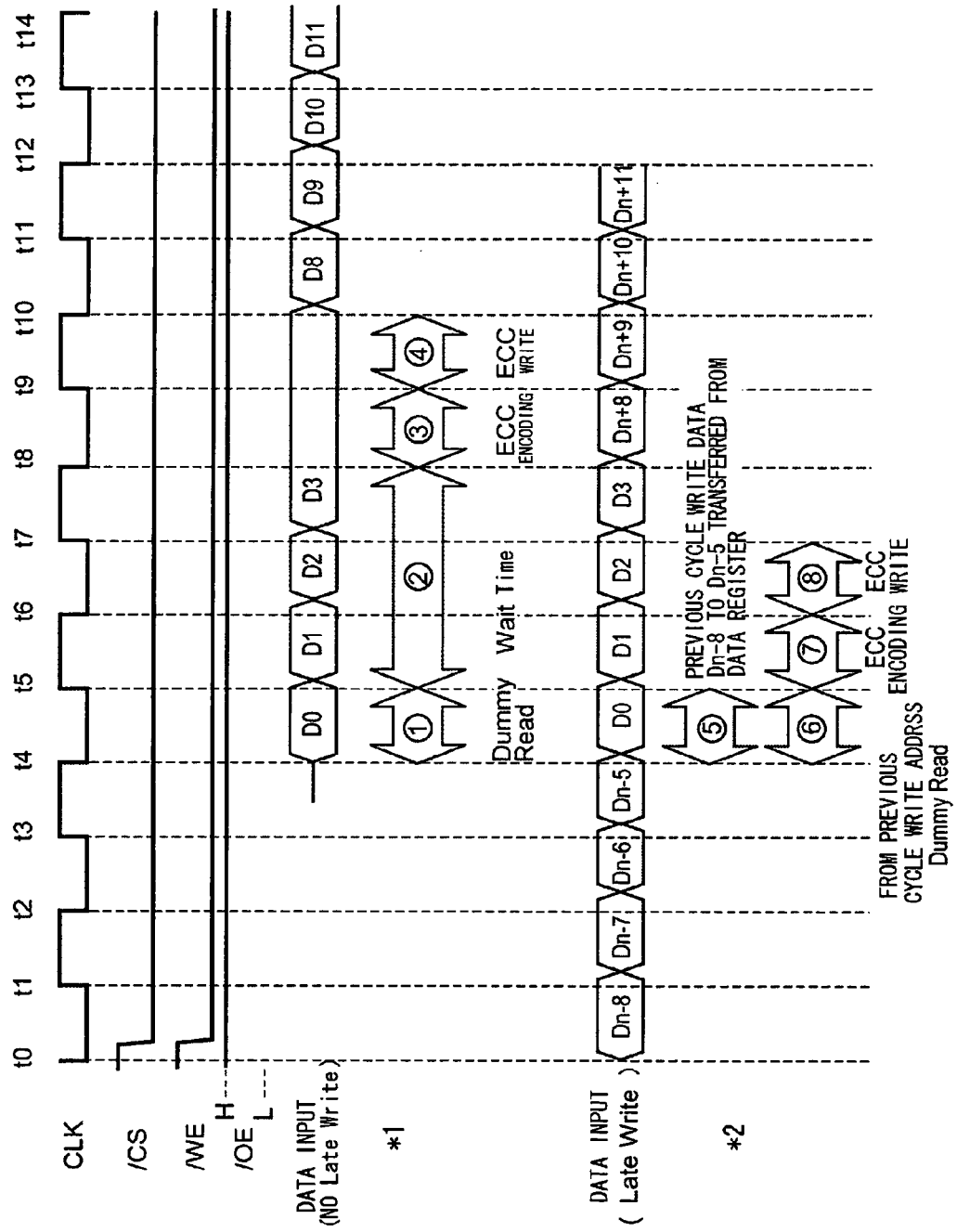
FIG. 13 is a second detailed timing diagram of a semiconductor memory according to the present invention.

In FIG. 13, an instance of a burst write in the absence of the late write function is indicated by "*1". For simplicity, the case in which the burst length is "8" is taken here by way of illustration. In FIG. 13, CLK stands for a clock signal having a preset minimum period. For example, with /CS (chip select) being low level, /WE (write enable) being low and with /OE (output enable) being high, the write mode is set. Data D0 to D3 are sequentially input as from time t4 until time t7.

At the time t4, dummy read from the memory cells is carried out for making up for data from D4 to D7 that are not entered (time period (1) in FIG. 13). The time interval since this time until time t8 when D3 input is established is a Wait time (time period (2) in FIG. 13). At a time point when the totality of data from data D0 to D3 are ready, the data D0 to D3 and the dummy read data D4 to d7 are combined together and ECC encoding of the so combined data is then carried out (time period (3) in FIG. 13). The so encoded data are written in the ECC cell (time period (4) in FIG. 13). In short, in the course of the consecutive burst write cycles D3 and D4, time loss due to ECC encoding and write time in the ECC cell from time t8 until time t10 inevitably comes out in the open.

In the third embodiment, as indicated by "*2" in FIG. 13, the late write function is used to render invisible the wait time until data corresponding to the burst length is ready. The data D0 to D3 are sequentially entered from time t4 until time t8.

At the timing t4, write data Dn-8 to Dn-5, entered during the previous write cycle, is transferred from the register (time period (5) in FIG. 13). As a parallel operation, dummy read is carried out from the memory cells corresponding to the address entered during the previous write cycle (time period (6) in FIG. 13).

At the timing t5, ECC encoding is carried out with the write data of the previous cycle and dummy read data corresponding to the write address of the previous cycle (time period (7) in FIG. 13).

At the timing t6, the resulting encoded data is written in the ECC cell (time period (8) in FIG. 13).

That is, by employing the late write function, the time interval from t5 until t8, which was a wait time until external data are ready as shown in "*1", is rendered invisible to achieve a continuous burst write operation.

Although the data mask signal (/DM) is fixed, in the present embodiment, this is not mandatory, such that the data mask signal may be changed halfway in the burst cycle.

The foregoing explanation of generation of the error correction bits is premised on an active mode operation. In short, during the active mode, the refresh operation is executed frequently, with the data reliability being high. During a standby mode, the refresh operation is carried out with a low frequency, that is, the frequency of the refresh operation is suppressed to the lowest value possible, insofar as cell hold characteristics are satisfied, in order to suppress power dissipation to the possible minimum. Thus, it may be presumed that the probability of destruction of cell data is higher during the standby mode operation than during the active mode operation. Consequently, error correction bits of higher reliability may be generated by carrying out only the generation of the error correction bits during the active mode operation. Normal read data or dummy read data may be corrected, using the error correction bits, by the standby mode operation or by the active mode operation, whichever is desired. For example, the error correction bits generated during the active mode operation before entering into the standby mode operation may be used during the standby mode operation to perform self-check of the cells to correct the destructed cell data by background processing. Similar corrections may also be carried out during the active mode operation following the end of the standby mode.

The ECC encoding circuit generates Hamming codes by the method shown in FIGS. 1 and 2. For decoding, the ECC decoding circuit generates 256-bit read data and the so generated read data are output every 64 bits in a burst through the read buffer 21. The read buffer 21 is controlled by an output signal from the access control circuit 21 activated during read.

The present invention is not limited to the above-described specified embodiments which may obviously be changed within the scope of the technical concept of the invention.

Figure 14:
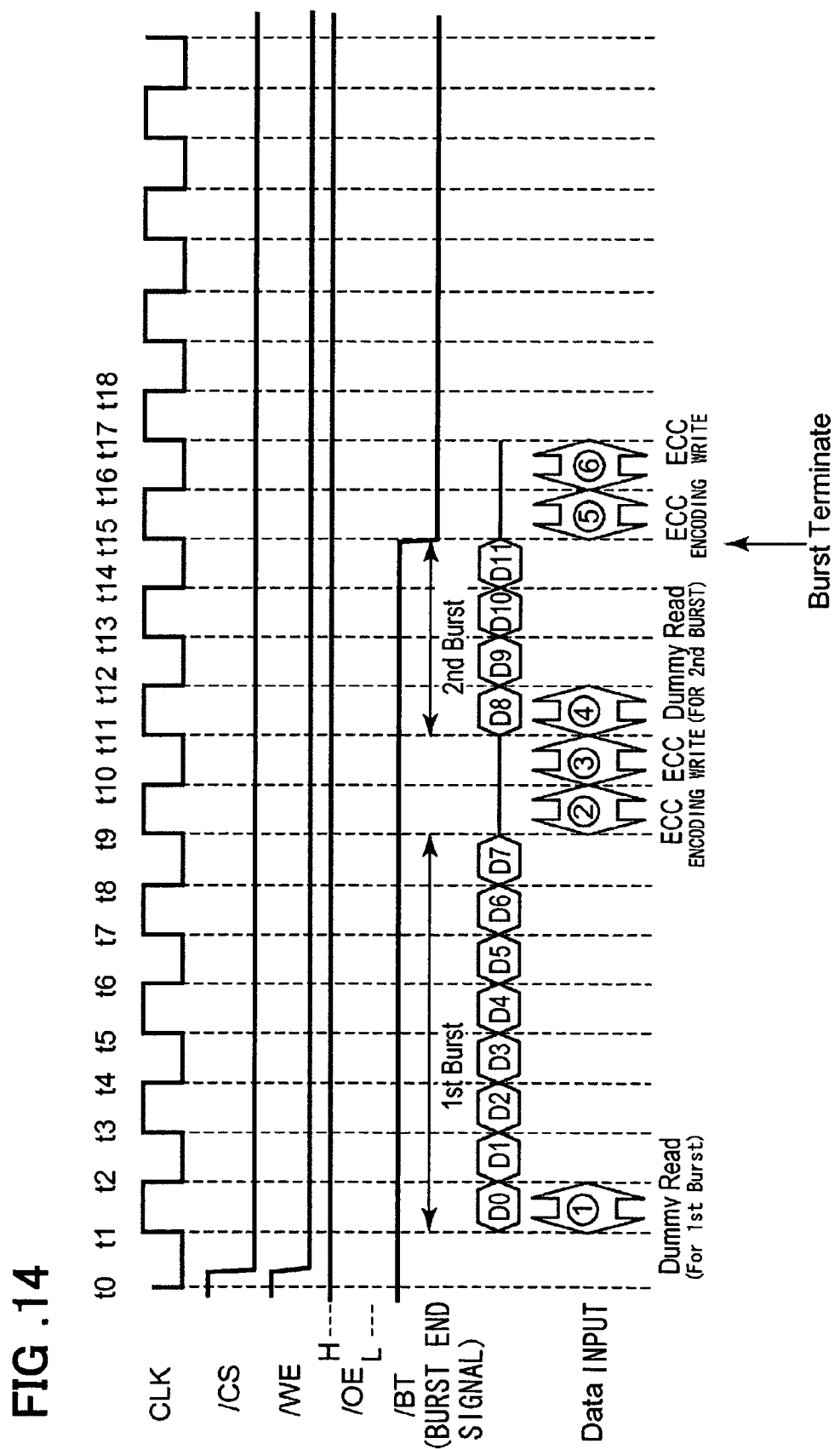
FIG. 14 is a third detailed timing diagram of a semiconductor memory according to the present invention.

For example, in the present embodiment, the first to fourth data are processed in one burst operation. However, the number of data processed per burst need not be limited to four. It is also apparently unnecessary that one data is to be limited to 64 bits. For example, the minimum write data length may be one word, out of 256 bits, that is, 8 bits. In this case, 248 bits are dummy-read from the associated memory cells. Although the number of access bits to the memory core is 256 bits, in the above explanation, there is no necessity of limiting the number of the access bits to this number. Moreover, the number of access bits to outside, for example, the width of the external write read bus, connected to the input/output pins, need not be limited to 64. In short, the present invention may be applied to a memory that permits burst read/write operations, that is, to a memory the internal core of which permits pre-fetch. Although the signal /RE is supplied to the data amplifier DA, it is also possible to supply the signal /WE and to construct the data amplifiers DA so that the data amplifiers may be activated by a high level of the signal /WE. (It is noted that the write amplifier WA is activated for a low level of the signal /WE.) Although data validity is checked in FIG. 4 by the write data mask signal /DM, a burst terminate signal (/BT), indicating the burst end, may also be used for a memory having the burst function, as shown in an example of FIG. 14. That is, in case a stop command is entered during the burst operation, viz. The /BT input is switched from a high level to a low level, data as from such time point is invalidated. In FIG. 14, the /BT signal falls after the inputting of data D8 to D11 for the burst write, such that 4 out of the burst length of 8 bits are in deficit. However, by dummy reading data of a burst length, corresponding to the finally determined address, during the time (4) in FIG. 14, ECC encoding may be carried out with the dummy read data and with the data D8 to D11, interrupted halfway (time period (5) in the drawing) and data storage may then be made in the ECC cell during the time period (6) in the drawing.

It may be said that the present invention, described above, proposes the technical concept, as an upper concept, consisting in eking out data in deficit with data stored in memory cells in case ECC encoding is for a preset number of bits and only part of write data needed for the ECC encoding is supplied.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A semiconductor storage device comprising:
  a plurality of memory cells;
  an error correction bit generating circuit for generating error correction bits from data of a predetermined number of bits; and
  an error correction code (ECC) cell storing said error correction bits,
  said error correction bit generating circuit generating said error correction bits using a first data supplied from outside of the semiconductor storage device together with a second data stored in associated memory cells,
  wherein said first data and said second data comprise said predetermined number of bits.

2. A semiconductor storage device comprising:
  a write amplifier receiving first data supplied from outside of the semiconductor storage device;
  a first group of memory cells for storing second data corresponding to an address associated with the first data;
  an error correction bit generating circuit for generating error correction bits based on the first data and the second data stored in said first group of memory cells;
  a second group of memory cells for storing the first data; and
  a third group of memory cells for storing the error correction bits generated by said error correction bit generating circuit.

3. The semiconductor storage device according to claim 1, further comprising
  an error detection and correction circuit that corrects data stored in said memory cells with associated error correction bits, in a case of said error correction bit generating circuit generating error correction bits using said data stored in said memory cells.

4. The semiconductor storage device according to claim 1, further comprising
  an access control circuit including a latency setting circuit for varying a timing of inputting said data or address responsive to a number of data supplied from the outside.

5. The semiconductor storage device according to claim 4, further comprising
  a refresh control circuit including a timer for setting a refresh cycle;
  said timer being adapted to realize the refresh cycle in accordance with a mode output from said access control circuit.

6. The semiconductor storage device according to claim 1, further comprising:
  an address register for late writing; and
  a data register;
  wherein said error correction bits are generated by said error correction bit generating circuit using write data corresponding to an address of a previous cycle stored in said data register and data stored in memory cells corresponding to the address of said previous cycle.

7. The semiconductor storage device according to claim 2, wherein
  an input terminal for inputting an address signal and a terminal for inputting/outputting a data signal are used in common.

8. A semiconductor storage device comprising:
  a plurality of memory cells;
  a circuit for writing data of a predetermined number of bits in a plurality of memory cells selected in a lump; and
  a circuit for performing control so that if part of said data of the predetermined number of bits are not written in associated memory cells in accordance with mask information, error correction bits are generated using said data stored in said associated memory cells.

9. The semiconductor storage device according to claim 8, wherein
  said data of the predetermined number of bits are entered in a burst mode.

10. The semiconductor storage device according to claim 8, having an access bit length smaller than an access bit length to memory cells, further comprising:
  an ECC (Error Correcting Code) encoding circuit for generating error correction bits, at a time of a writing operation, using external data received from outside, said external data being of a length corresponding to a number of access bits to said memory cells, in keeping with one access address; and
  an ECC decoding circuit for carrying out ECC decoding in a read operation, based on data corresponding to the length of the access bits to said memory cells for one access address and on associated error correction bits;
  wherein said ECC encoding circuit generates error correction bits using data stored in memory cells corresponding to said access address in case data received for an access address during the write operation is smaller than the access bit length to said memory cells.

11. The semiconductor storage device according to claim 1, having a burst mode, wherein in case n data to be supplied in the burst mode are masked such that there is provided only pert of said n data, the error correction bits are generated using the part of said n data and data stored in the associated memory cells.

12. The semiconductor storage device according to claim 1, wherein said semiconductor storage device has a burst function of a burst length of n; and wherein said semiconductor storage device comprises:

first to n'th cell blocks;

first to n'th write amplifiers for outputting n write data to first to n'th cell blocks respectively, said n write data being supplied sequentially from outside of said semiconductor storage device;

an ECC encoding circuit for receiving outputs of said first to n'th write amplifiers and generating codes for error correction and detection to store the generated codes in an ECC code cell area; and first to n'th data amplifiers for reading data from said first to n'th cell blocks respectively; wherein as for the write data specified to be masked out of said a write data, data read from the cell block of an associated address through an associated data amplifier are supplied to said ECC encoding circuit; and said ECC encoding circuit generates codes for error correction and detection for n data, using write data entered, out of n write data, and the data read from the cell block, to store the generated codes in said ECC code cell area.

13. The semiconductor storage device according to claim 12 further comprising an ECC decoding circuit for receiving first to n'th read data from said first to n'th data amplifiers and receiving codes for error correction and detection associated with said first to n'th read data from said FCC code cell area, to carry out error correction;

an output of said ECC decoding circuit being supplied to said ECC encoding circuit as read data of at least one of said first to n'th cell blocks.

* * * * *